(12) United States Patent
Morgan et al.

(10) Patent No.: US 12,536,526 B2
(45) Date of Patent: Jan. 27, 2026

(54) PAPERLESS TICKET MANAGEMENT SERVICE

(71) Applicant: NCR Voyix Corporation, Atlanta, GA (US)

(72) Inventors: Kip Oliver Morgan, Atlanta, GA (US); Aaron Xiao, Lawrenceville, GA (US); Gina Torcivia Bennett, Lawrenceville, GA (US); Praneeth Erwin Luck Eddu, Conyers, GA (US); Noah Tyler Gardner, Dacula, GA (US); Elliot Thomas Gegen, Olympia, WA (US); Will Thomas Hodges, Statesboro, GA (US); Aleah Jean Kadry, Atlanta, GA (US); Haoyong Xue, Huntsville, AL (US)

(73) Assignee: NCR Voyix Corporation, Atlanta, GA (US)

( * ) Notice: Subject to any disclaimer, the term of this patent is extended or adjusted under 35 U.S.C. 154(b) by 330 days.

(21) Appl. No.: 17/489,643

(22) Filed: Sep. 29, 2021

(65) Prior Publication Data

US 2023/0100005 A1    Mar. 30, 2023

(51) Int. Cl.
*G06Q 20/36* (2012.01)
*G07F 17/32* (2006.01)
(Continued)

(52) U.S. Cl.
CPC ........... *G06Q 20/36* (2013.01); *G07F 17/329* (2013.01); *G07F 17/42* (2013.01); *H04L 9/3236* (2013.01); *G06Q 2220/00* (2013.01)

(58) Field of Classification Search
CPC ....... G06Q 20/36; G07F 17/329; G07F 17/42; H04L 9/3236
See application file for complete search history.

(56) References Cited

U.S. PATENT DOCUMENTS 7,093,130 B1 * 8/2006 Kobayashi .............. H04L 63/12
713/168
9,390,591 B2 * 7/2016 Granich ................ G07F 17/329
(Continued)

FOREIGN PATENT DOCUMENTS

CN          105678365 B  *  6/2020
WO      WO-2008011632 A2 *  1/2008  ............. G07F 17/32

OTHER PUBLICATIONS

J. Li, Z. Zhang and M. Li, "BanFEL: A Blockchain Based Smart Contract for Fair and Efficient Lottery Scheme," 2019 IEEE Conference on Dependable and Secure Computing (DSC), Hangzhou, China, 2019, pp. 1-8, doi: 10.1109/DSC47296.2019.8937559. (Year: 2019).*

(Continued)

*Primary Examiner* — Eduardo Castilho
(74) *Attorney, Agent, or Firm* — Schwegman Lundberg & Woessner, P.A.

(57) ABSTRACT

When an electronic ticket is purchased, the ticket is maintained electronically (paperless format) on a consumer-operated device via a ticket wallet application (app). Wallet app obtains ticket details via a scan of an image of the ticket captured from a display of a ticket vendor terminal. Only the wallet app maintains ticket details of the ticket; however, a ticket service cooperates with the wallet app to validate the ticket, to track redemption of the ticket, to authorize printing of the ticket, and to manage the ticket with other tickets of a consumer associated with consumer-operated device.

12 Claims, 3 Drawing Sheets

(51) Int. Cl.
  *G07F 17/42* (2006.01)
  *H04L 9/32* (2006.01)

(56) References Cited

U.S. PATENT DOCUMENTS

| | | | | |
|---|---|---|---|---|
| 9,679,303 B1* | 6/2017 | Griffin | | G06Q 30/0214 |
| 10,929,840 B1* | 2/2021 | Ramanathan | | G06Q 20/363 |
| 2002/0065783 A1* | 5/2002 | Na | | G06Q 10/02 |
| | | | | 705/64 |
| 2003/0069904 A1* | 4/2003 | Hsu | | G06F 21/10 |
| 2003/0171960 A1* | 9/2003 | Skinner | | G07B 15/00 |
| | | | | 705/5 |
| 2010/0250385 A1* | 9/2010 | Lempel | | G06Q 30/02 |
| | | | | 705/26.1 |
| 2012/0089468 A1* | 4/2012 | Guziel | | G06Q 20/20 |
| | | | | 705/16 |
| 2012/0197805 A1* | 8/2012 | Chung | | G06Q 20/382 |
| | | | | 705/64 |
| 2012/0323708 A1* | 12/2012 | Marinakis | | G07F 17/329 |
| | | | | 705/16 |
| 2013/0179250 A1* | 7/2013 | Nguyen | | G06Q 20/387 |
| | | | | 705/14.38 |
| 2014/0025573 A1* | 1/2014 | Keronen | | G06Q 20/322 |
| | | | | 705/41 |
| 2015/0188698 A1* | 7/2015 | Tsai | | H04L 9/0877 |
| | | | | 713/171 |
| 2017/0017947 A1* | 1/2017 | Robinton | | G06Q 20/40 |
| 2017/0084116 A1* | 3/2017 | Anderson | | G07F 17/3225 |
| 2017/0228665 A1* | 8/2017 | Levin | | G06K 5/00 |
| 2019/0066450 A1* | 2/2019 | Saccoccio | | G07F 17/329 |
| 2019/0206012 A1* | 7/2019 | Granich | | G06Q 30/0261 |
| 2019/0259239 A1* | 8/2019 | Barnes | | G06T 19/006 |
| 2020/0145820 A1* | 5/2020 | Hoyer | | G06N 20/00 |
| 2021/0233058 A1* | 7/2021 | Mandaara | | G06Q 20/208 |
| 2022/0036690 A1* | 2/2022 | Ragnoni | | G06Q 50/34 |
| 2022/0319270 A1* | 10/2022 | Brzozowski | | G07F 17/3244 |
| 2023/0360497 A1* | 11/2023 | Rosell | | A63F 13/92 |

OTHER PUBLICATIONS

G. Me, "Security overview for m-payed virtual ticketing," 14th IEEE Proceedings on Personal, Indoor and Mobile Radio Communications, 2003. PIMRC 2003., Beijing, China, 2003, pp. 844-848 vol. 1, doi: 10.1109/PIMRC.2003.1264392 (Year: 2003).*

Luxiong Xu, Na Wang and Chenglian Liu, "Security of electronic ticketing," 2010 International Conference on Computer and Communication Technologies in Agriculture Engineering, Chengdu, 2010, pp. 372-379, doi: 10.1109/CCTAE.2010.5543314 (Year: 2010).*

G. Thawre et al., "Use Cases of Authentication Protocols in the Context of Digital Payment System," 2020 11th International Conference on Computing, Communication and Networking Technologies (ICCCNT), Kharagpur, India, 2020, pp. 1-6, doi: 10.1109/ICCCNT49239.2020.9225428 (Year: 2020).*

* cited by examiner

PAPERLESS TICKET MANAGEMENT SERVICE

BACKGROUND

Increasingly, tickets of all types are being purchased and redeemed electronically. In fact, because of COVID-19 many large organizations now only handle and allow electronic tickets. For example, Major League Baseball (MLB®) and the NCAA® have prohibited printed tickets.

Yet some tickets are still printed, particularly lottery tickets, which are issued and administered by government agencies/commissions. There are largely two types of lottery tickets. The first type is electronically purchased (through lottery vendors), printed and provided to customers, scanned by the vendor when the customers redeem winning tickets, and redeemed online by the vendors on behalf of the customers. The first type of ticket largely consists of number-based games of chance, such as Powerball®, Mega Millions®, and other number-based lottery tickets (e.g., Keno®, pick 3, pick 4, etc.). The second type of ticket is largely associated with scratch-offs, which are purchased as printed tickets but are still redeemed online by lottery vendors with the appropriate government agencies that issued the scratch-offs on behalf of winning customers.

As the world moves toward paperless transactions, government managed tickets are still largely if not entirely printed. Governments are largely concerned with fraud should electronic-issued tickets be stolen online through hackers or malicious programs. However, governments also desire to increase lottery tickets sales and realize that online ticket sales can substantially increase government revenues.

Conversely, consumers largely do not like printed lottery tickets because any printed tickets that are lost or stolen cannot be recovered by the consumers, purchasing large quantities of tickets are difficult to manage and organize (such as when one individual of a group purchases lottery tickets for the group or one individual purchases lottery tickets for both certain members of the group and the group as a whole), infrequent lottery ticket consumers are often unaware of the lottery draw dates or forget that drawings have already taken place, winning tickets typically have to be redeemed within 1 year of the date of purchase or they will not be honored, and some lottery ticket consumers believe that buying lottery tickets is associated with negative connotations about the habits of the consumers and therefore they want to discreetly purchase the tickets without carrying around printed tickets, which may be unintentionally seen by friends or family of the consumers.

SUMMARY

In various embodiments, a system and methods for providing a paperless ticket management service are provided.

According to an embodiment, a method for operating a paperless ticket management service is presented. A hash value is generated for an electronic ticket without maintaining a unique serial number for the electronic ticket. A device identifier associated with a device that maintains the electronic ticket is linked to the hash value. A record associated with the electronic ticket is maintained using the hash value and the device identifier. An authentication message or a non-authentication message is provided when a redemption request is made on the electronic ticket based on the record.

DETAILED DESCRIPTION

Figure 1:
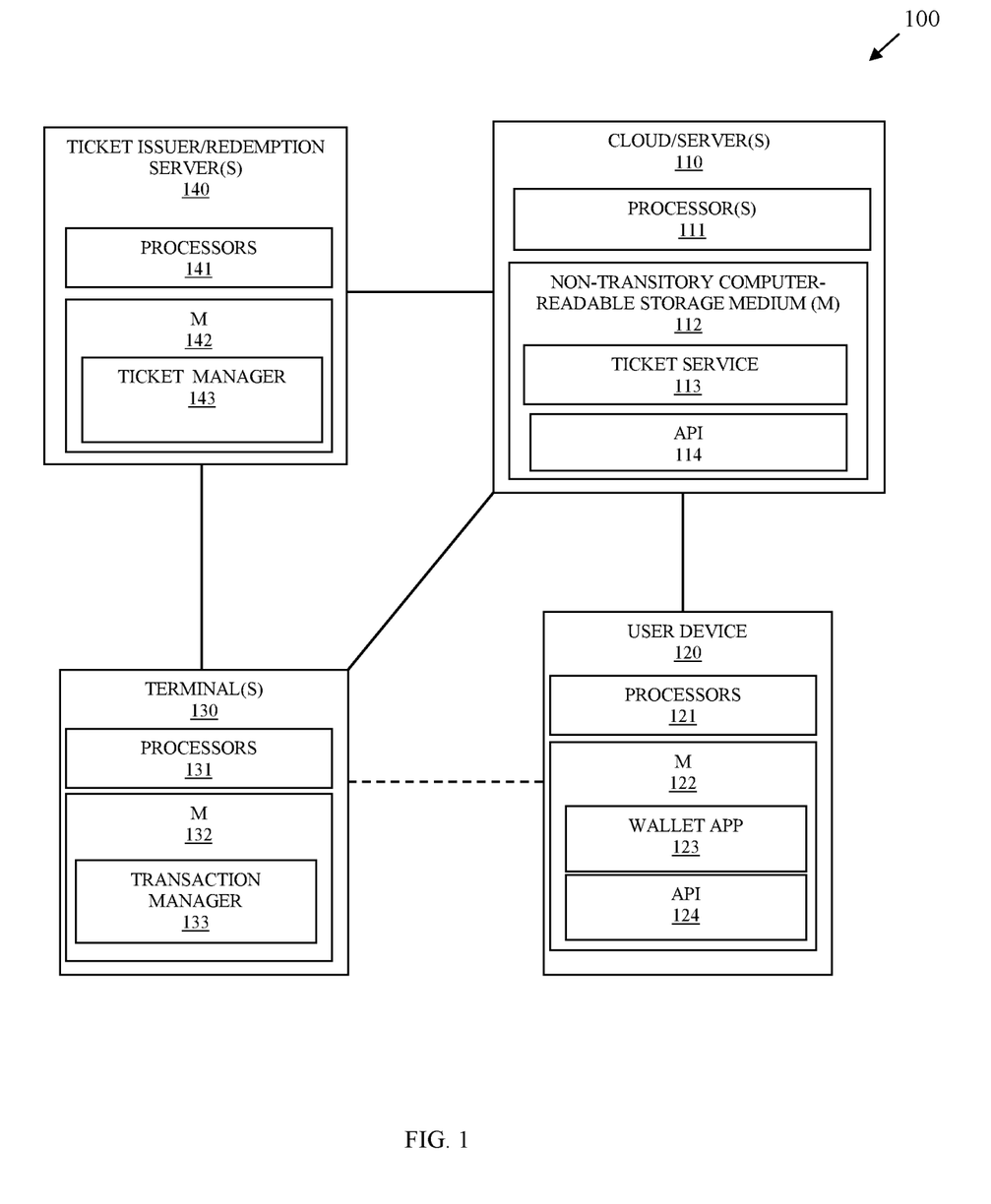
FIG. 1 is a diagram of a system for providing a paperless ticket management service, according to an example embodiment.

FIG. 1 is a diagram of a system/platform 100 for providing and operating a paperless ticket management service, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing and operating a paperless ticket management service, presented herein and below.

System/platform 100 (herein after just "system 100") provides a processing environment by which a ticket service interacts with ticket issuing/redeeming servers, ticket vendor terminals, and user-operated mobile devices to provide management of electronic tickets, such that tickets can be purchased and managed electronically without requiring a printed ticket and can be redeemed either electronically (when permitted by the ticket redemption servers and/or redemption vendor terminals) or via on demand printing at a time and a place desired by the consumer, such that an on-demand printout of the ticket can be redeemed by the consumer. In fact, when printed tickets are required to be presented as proof for redemption, the ticket can be entirely managed and verified electronically and printed just before or during a redemption process by or on behalf of the consumer. Furthermore, electronic tickets of the consumer can be organized and managed on behalf of the consumer via a wallet application (app), which can track consumer ticket purchases, provide automatic notification of winning tickets, provide automatic notification of winning tickets set to expire, provide a trackable audit records of winning and non-winning tickets, and provide a security-based link between a purchased ticket and the consumer's mobile device for purposes of preventing a fraudulent taking of a ticket from possession of the consumer. System 100 and methods presented herein also provide a variety of other beneficial features and capabilities as referenced in the embodiments below.

As used herein, the terms "customer," "consumer," "ticket redeemer," and/or "ticker purchaser" may be used interchangeably and synonymously herein and below. This refers to an individual that has purchased and/or is redeeming a ticket.

Furthermore, the terms "redeem," "redemption," and/or "redeeming" refers to a ticket being presented by a customer for purposes of entry into an establishment, acquisition of an item or a discount on an item, and/or cashing out a winning lottery ticket.

System 100 comprises a cloud/server 110, a plurality of user-operated devices 120, a plurality of ticket vendor terminals 130, and one or more ticket issuer/redemption servers 140.

Cloud/Server 110 comprises at least one processor 111 and a non-transitory computer-readable storage medium 112. Medium 112 comprises executable instructions for ticket service 113 (hereinafter just "service 113) and an Application Programming Interface (API) 114. The executable instructions when provided to and executed by processor 111 from medium 112 cause processor 111 to perform the processing discussed herein and below for service 113 and API 114.

Each user device 120 comprises at least one processor 121 and a non-transitory computer-readable storage medium 122. Medium 122 comprises executable instructions for a digital wallet application (app) 123 and an API 124. The executable instructions when provided to and executed by processor 121 from medium 122 cause processor 121 to perform the processing discussed herein and below for wall app 123 and API 124.

Each vendor terminal 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133.

Each ticket issuer/redemption server 140 (hereinafter just "issuer/redemption server 140") comprises at least one processor 141 and a non-transitory computer-readable storage medium 142. Medium 142 comprises executable instructions for a ticker manager 143. The executable instructions when provided to and executed by processor 141 from medium 142 cause processor 141 to perform the processing discussed herein and below for ticket manager 143.

FIG. 1 illustrates a broken line between vendor terminal 130 and user device 120 this is intended to illustrate that information displayed on a display of terminal 130 is captured by a camera of user device 120 and then subsequently processed by wallet app 123 in the manners discussed below. Thus, there does not have to be any electronic communication connection or session between the vendor terminal 130 and user device 120 for purposes of many of the embodiments that follow as information provided by terminal 130 can be captured via a scan of the information on a display of terminal 130 and processed by app 123 through the image of the information.

Further purposes of the embodiments that follow, ticket issuer/redemption servers 140 are governmental lottery agencies or commissions that issue and redeem lottery tickets. However, it is to be noted that other types of tickets can be processed by system 100, such as venue-based tickets, non-governmental charity-based raffle tickets, government authorized sports/chance betting tickets managed by casinos or gaming industries, and other types of tickets.

Initially, a consumer operating user device 120 initiates a purchase of a lottery ticket via terminal 130. Terminal 130 can be a Self-Service Terminal (SST) when the consumer is performing a self-checkout for items or purposes that are unrelated to the ticket purchase (e.g. groceries at a Self-Checkout (SCO) terminal, fuel at fuel kiosk, and/or financial transaction at an Automated Teller Machine (ATM)) or when the consumer is specifically self-operating terminal 130 for the express purpose of buying the lottery ticket (e.g., terminal 130 is a lottery ticket kiosk). Terminal 130 may also be a Point-Of-Sale (POS) terminal that is operated by a clerk to check out a consumer who is also purchasing items unrelated to the ticket or the POS terminal can be a dedicated terminal operated by the clerk for the express purpose of selling lottery tickets to the consumer (e.g., in-store dedicated lottery terminal).

In a first configuration of system 100, ticket manager 133 interacts with ticket service 113 to make the ticket purchase request of the ticket issuer server 140. Ticket service 113 uses API 114 to request the ticket purchase with the consumer-provided ticket criteria (ticket type (e.g., Powerball®, pick 3, etc.), options (e.g., auto pick, specific consumer-provided numbers, kicker selected or not selected, multiplier selected or not selected, etc.), wager amount, quantity desired, etc. Ticket manager 143 returns the unique ticket details that satisfy the ticket purchase request back to ticket service 113 through API 114.

In a second configuration of system 100, ticket service 113 need not interact with ticket issuer/redemption server 140; rather, terminal 130 interacts with ticket manager 143 and receives back the unique ticket details that satisfy the ticket purchase request and the consumer-provided ticket criteria. Transaction manager 133 then provides the unique ticket details to ticket service 113 via API 114.

In third configuration of system 100, neither ticket manager 133 nor transaction manager 133 need directly interact with nor communicate with ticket service 113. In a fourth configuration of the third configuration, transaction manager 133 is modified to display the unique ticket details returned by ticket manager 143 on a display of terminal 130 for capturing by the consumer who is operating user device 120. The ticket details may be displayed by transaction manager 133 entirely as a Quick Response (QR) code or barcode, or the ticket details may be displayed by transaction manager 133 as an image of the actual ticket that transaction manager 133 was instructed to print for the customer by ticket manager 143 (print preview of the ticket purchased). In a fifth configuration of the third configuration, transaction manager 133 may be modified to explicitly not print the ticket and to just display the QR code/barcode or just display the print preview of the ticket purchased. In a sixth configuration of the third configuration, transaction manager 133 is unmodified and causes the ticket to be printed on a printer associated with terminal 130 for acquisition by the consumer at terminal 130.

In a sixth configuration of system 100, ticket service 113 interacts with both ticket manager 143 and transaction manager via API 114.

In the first, second, and/or the sixth configurations, ticket service 113 encodes the ticket details into a QR code or a barcode and uses API 114 and instructs transaction manager 133 to display the QR code or the barcode only or instructs transaction manager 133 to display a print preview of the ticket, which comprises a portion of the image with the corresponding QR code or the corresponding bar code. Additionally, ticket service 113 obtains the ticket serial number/string and security code, concatenates them together and hashes the concatenated string to obtain a unique hash value for the ticket. Ticket service 113 creates a new record that comprises only, the hash value, the purchase date, the purchase time of day, a vendor terminal identifier for terminal 130, and a ticket issuer server identifier for ticket issuer server 140. The actual ticket serial number/string and security code and other ticket details are not stored nor retained in the record. This ensures that should cloud/server 110 be compromised the only information that a hacker or a malicious program could obtain is the hash value, the purchase date, the purchase time of day, the vendor terminal identifier, and the ticker issuer server identifier, which is useless and does not create any security risk of actual ticket being stolen from the consumer. Any image of the ticket and the ticket details are also removed from memory of the cloud/server 110.

In any of the six configurations, the consumer operates user device 120 and opens or initiates wallet app 123 and selects a scan new ticket option within the user-facing interface of app 123. Wallet app 123 utilizes the integrated camera of device 120 to detect within a field of view of the camera a QR code, a barcode, or an image of the printed ticket with integrated QR code or barcode. App 123 can utilize image templates to identify any print preview of the ticket and map structural components of the ticket to the a template for purposes of identifying portions of the image that correspond to an entity that issued the ticket (ticket issuer server 140), date of the ticket, time of day of the ticket, type of ticket, QR code or barcode portion of the image, etc. The QR code or barcode is decoded to obtain the ticket details for ticket serial number/string and security code. Optical Character Recognition (OCR) can be processed on other details displayed in the image, such as numbers selected, options selected, etc. The values of each component of the template obtained from the image and/or QR code or barcode are encrypted with a device key associated with device 120 and stored on device 120. It is to be noted that these encrypted values are not stored outside of device 120 and are encrypted with a private key of device 120, such that they can only be decrypted by app 123 on device 123 when needed by app 123 to perform various features and capabilities (as discussed below). App 123 then uses API 124 to communicate the ticket serial number/string and security code of the ticket back to ticket service 113. Service 113 hashes the ticket serial number/string with security code and obtains a unique hash value. Service 113 searches records for the unique hash value, if no match is found, then this is an indication to service 113 that the ticket is being reported a first time and a record is created comprising the hash value, the date of purchase (obtained from the ticket details), the vendor terminal identifier for terminal 130 (obtained from the ticket details), and a ticket issuer server identifier (obtained from the ticket details). This is an indication that the ticket is being first communicated to service 113 by app 123 and not through server 140 nor terminal 130. Additional information associated with user device 120 may also be stored in the record, such as a device identifier for device 120. This links the ticket explicitly to user device 120.

In the fourth configuration, app 123 instructs the consumer that the ticket is recorded and registered with app 123.

In the fifth configuration, the consumer operates device 120 and app 123 to capture the ticket details via a printed ticket; rather than from a display of terminal 130. Once the ticket is captured and processed by app 123, the user-facing interface of app 123 can instruct the consumer that the ticket can be safely destroyed and discarded.

A seventh configuration of system 100 utilizes any combination of the six configurations, such that service 113 is aware of and has a record for the ticket indexed on the unique hash value when the app 123 processes a QR code/barcode or a displayed/printed image of the ticket. Here, when app 123 independently reports the ticket details that hash to the unique hash value, service 113 sets a flag on the record and records in the record the unique device identifier for user device 120.

Any time a ticket is redeemed after being linked to the user device 120, ticket service 113 invalidates any subsequent attempt to redeem or to register the ticket.

In an embodiment, app 123 may include a user option within the user-facing interface that permits the user through app 123 to transfer the ticket to a different device 120. In such a case, both the source and target user device 120 have an executing instance of app 123 and utilize API 124 to interact with service 113 to update the corresponding record associated with the ticket and link the ticket to the target device 120. This option may require credentials of the user to be entered that are specific to the delinking and relinking the ticket.

App 123 provides a print option that permits the consumer to print the ticket from device 120 on demand through a user-facing interface of app 123, such a feature may require a user credential to decrypt the original ticket details and generate a printed ticket. Additionally, app 123 keeps track each time a print of the ticket was requested and was successful to a printer, such that should the user request a print of the ticket after a first successful print, the user is informed that the ticket was previously printed on a specific printer, on a specific date, and at a specific time and request that the user confirm that the user desires the print the ticket an additional time. Moreover, the record for the ticket maintained by service 113 may be checked by app 123 through API 124 each time a print is requested to determined whether the ticket was already redeemed or not. That is, for the first and second configurations, service 113 rehashes any redeemed ticket's serial number/string and security code and matches it to a corresponding record and updates the record with the redeeming vendor terminal identifier, redeeming redemption server identifier, redeem date, and redeemed time of day, such that when a print is requested app 123 asks for verification from service 113 on the ticket. If the ticket was deemed, app 123 displays the redeem date and redeem time of day back to the user and says the print request cannot be fulfilled. Optionally, a store location associated with the redemption vendor terminal identifier can be provided to the user when the print request is invalid since the ticket has already been redeemed.

During redemption, transaction manager 133 and/or ticket manager 143 provide the ticket details to service 113. Service 113 hashes the ticket serial number/string and security code to obtain a candidate hash value. The candidate hash value is searched in the records and if not found, the ticket is deemed authenticate and a message is sent to ticket manager 143 that the ticket can be redeemed. Service 113 also updates the matched record to include the redemption vendor terminal identifier, the redemption server identifier, the redemption date, and the redemption time of day. Optionally, service 113 sends a message to app 123 using the linked user device identifier of device 120 causing app 123 to push a notification message on device 120 indicating that the ticket was just redeemed at a store location associated with the redemption vendor terminal identifier.

App 123 also provides a variety of management features associated with each ticket purchased by a consumer/user.

For example, app 123 collects a variety of ticket information from the ticket details, such as ticket type, ticket jurisdiction, ticket criteria, ticket value information (selected lottery numbers on the ticket), purchase date, purchase time of day, purchase amount, etc. This permits app 123 to organize multiple tickets and allow the user through the user-facing interface to sort, view, and search each ticket purchased by the user. The ticket type and the ticket jurisdiction permit app 123 to uses API 124 to obtain additional information about the ticket through a ticket issuer's website by directly interacting with the website or by scraping the website to identify when the ticket's drawing is scheduled to take place and winning numbers after the ticket's drawing takes place.

For example, suppose the ticket is a lottery ticket for Powerball®, app 123 can identify from the ticket details of a user ticket the date of purchase of the ticket and the type of ticket (Powerball®). The website for Powerball® lists the next upcoming drawing date and well as the numbers drawn for past drawings. App 123 can use API 124 to scrap the website and obtain winning numbers that are associated with a user's ticket and also obtain the next draw date associated with a user's ticket. If the drawing for a ticket took place already, the ticket's numbers can be cross-checked against the winning numbers and app 123 can determine whether the user's ticket won or lost. When the user won, a push notification can be raised on device 120 by app 123 to inform the user that the ticket won and the amount of the winning ticket (also obtained from Powerball's® website). A push notification may also inform the user when the ticket lost. A running total of winning and losing tickets for a given year can be maintained by app for viewing via the user-facing interface of app 123. The ticket details may be maintained on device 120 for both winning and losing tickets, winning for taxable income and losing tickets to support offsetting any winnings on the user's taxes (each ticket is reproducible through a tax print feature that prints each ticket with a word such as TAX COPY across the printed ticket image). In this way, the user can view how much was spent by the user on lottery tickets, when and how much was won by the user for the year or for all ticket purchases and how much the loser lost on lottery tickets. The winning push notifications may also continue at some pre-defined interval of time until the user prints the winning ticket or app 123 receives a notification from service 113 that the winning ticket was redeemed. Additional notifications for winning tickets may be provided when app 123 determines that a winning ticket's purchase date is approaching a configured amount of time that precedes the calculated expiration date for redeeming the winning ticket, these additional notifications may display a warning message on device 120 stating the winning ticket of X dollars is set to expire in the configured amount of time. The frequency of the additional notifications for expiring tickets can be set by the user within the user-facing interfaces through a preference option. Winning and losing tickets may be encrypted and archived by app 123 on device 120 for access upon requests of the user through the user-facing interface.

As another feature, app 123 may maintain a running countdown for a drawing date of a user ticket. The countdown to drawing may be displayed within the user-facing interface when the user selects the ticket for viewing from a plurality of available user tickets or when the ticket is the only active ticket of the user upon activation of app 123 by user on device 123.

In an embodiment, the ticket issuer server 140 permits service 113 to purchase tickets on behalf of consumers independent of any terminal 130. In such embodiments, the features of transaction manager 133 may be processed and subsumed into service 113.

In an embodiment, the ticket issuer server 140 permits direct purchases by a consumer independent of any terminal 130. In such embodiments, the features of transaction manager 133 may be processed and subsumed into app 123.

In an embodiment, winning and losing scratch-off tickets may be scanned via device 120 by the user and tracked within app 123 as winning and losing scratch-offs. Here, the ticket type informs app 123 that the ticket does not require any tracking for validity with service 113 nor are printing security features needed, since the ticket is already printed and presumed already redeemed or about to be redeemed by the user. App 123 may keep track of totals for both electronic tickets and scratch-off tickets combined and separate totals for each ticket category (electronic and scratch-off), such that the user can view total lottery ticket history and view individual ticket category histories within the user-facing interface of app 123.

In an embodiment of the previous embodiment, service 113 may be used to track when a scratch-off is redeemed in a similar manner to what was discussed above, namely when the ticket's serial and security code hash value is calculated during redemption of the ticket at a terminal 130, such that app 123 reports the scanned ticket and service 113 creates an audit record (as discussed above) or matches to an existing audit record for purposes of identifying and tracking when the scratch-off ticket is redeemed. Again, upon redemption, service 113 may send a redemption message to app 123 and app 123 may raise a notification on device 120 that the scratch-off ticket scanned is being or just has been redeemed at a terminal location associated with terminal 130.

In an embodiment, app 123 sorts user tickets by winning and losing tickets and maintains separate histories for each and a combined history for both winners and losers.

In an embodiment, app 123 permits the user through the user-facing interfaces to define filters or perform searches against the ticket history. For example, a user may request a total and a listing of all Powerball® tickets purchased in the last three months by the user, in response app, 123 provides a listing of tickets that match the user-defined criteria from the ticket history along with a calculated purchase total for the tickets that meet the criteria back to the user. In another example, the user may provide criteria requesting all tickets and a total purchase amount that the user purchased at a specific store within the last three months, in response, app 123 matches the store to one or more terminal identifiers and provides back a listing and total to the user. Each listing provided to the user may further be filtered on winning and losing tickets upon a user filter request through the user-facing interface and/or highlighted or colored within the listing based on whether each ticket was a winner or a loser by app 123 when provided to the user.

In an embodiment, a template used by a printer associated with the transaction manager on terminal 130 for printing the ticket may be used by service 113 for purposes of identifying component portions of the ticket during any OCR of the image of the ticket on a display of terminal 130. Identification of the template may be based on a terminal identifier for terminal 130.

It is to be noted that only device 120 maintains the ticket details in an encrypted format that is only accessible to app 123. Service 113 only maintains a unique hash value on the ticket serial and security code for purposes of authenticating a ticket being redeemed for ticket manager 143 and for tracking redemption status and device association on behalf of device 120. This ensures security of the ticket limiting exposure of theft to just device 120 and ensures a user cannot try to print an already redeemed ticket unless the printing is for tax or reporting (as discussed above).

Figure 2:
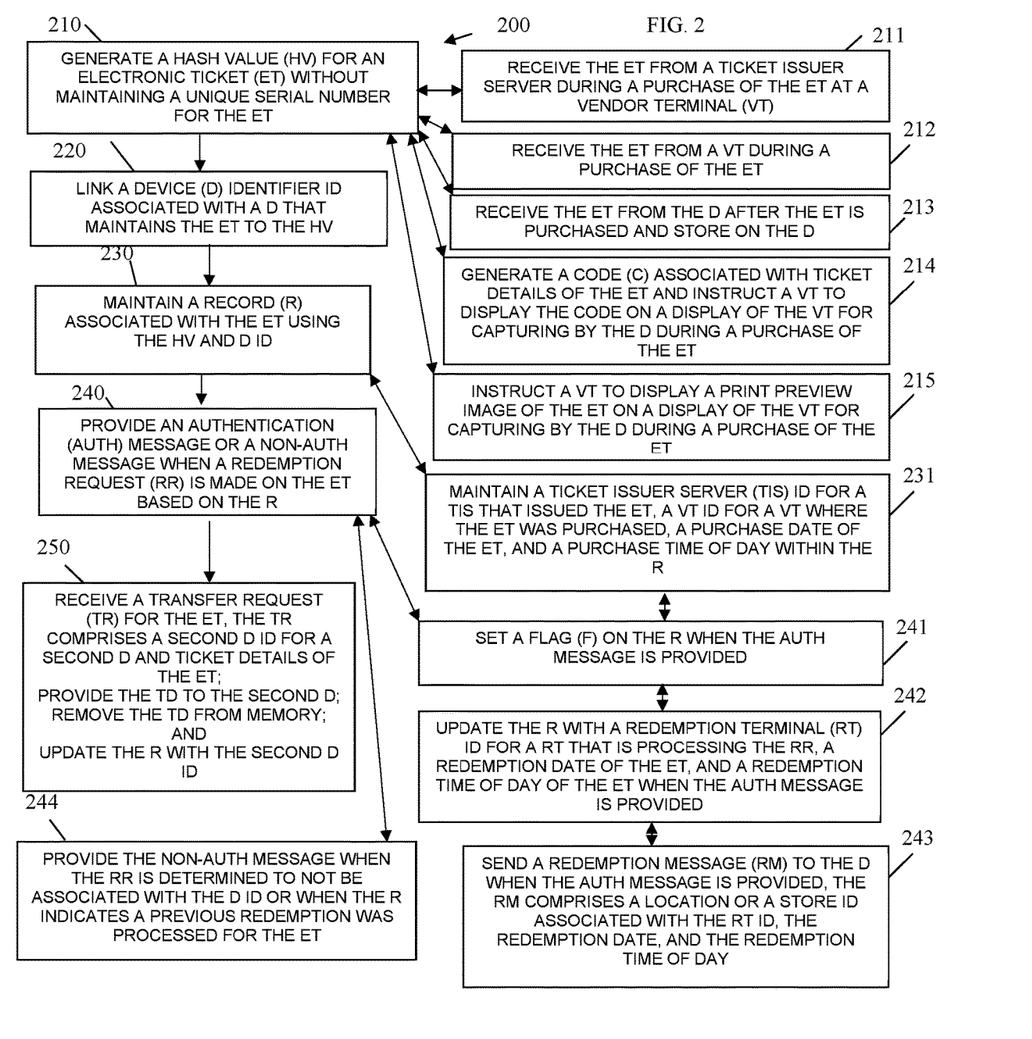
FIG. 2 is a diagram of a method for operating a paperless ticket management service, according to an example embodiment.
Figure 3:
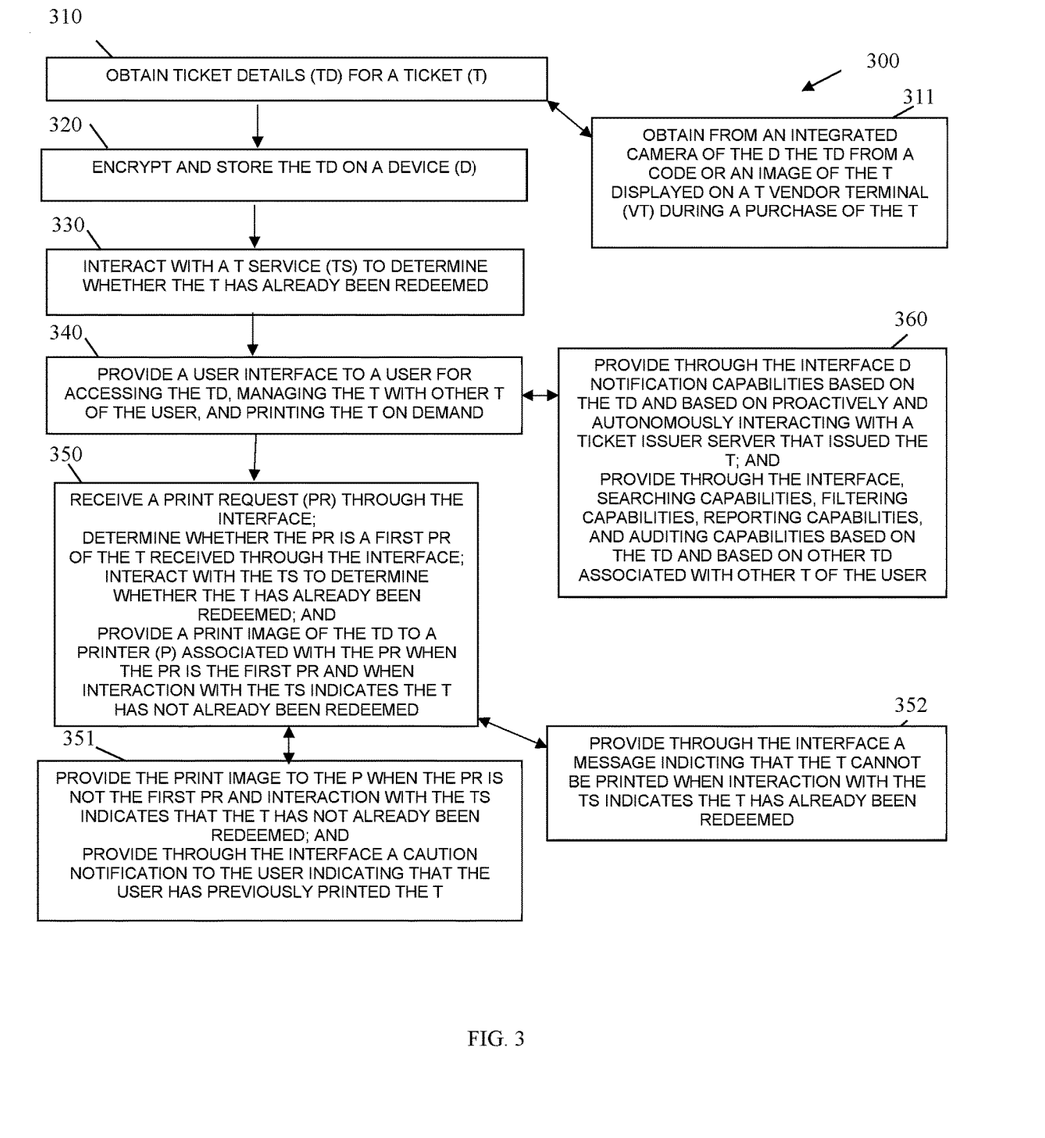
FIG. 3 is a diagram of another method for operating a paperless ticket management service, according to an example embodiment.

The above-referenced embodiments and other embodiments are now discussed within FIGS. 2-3.

FIG. 2 is a diagram of a method 200 for operating a paperless ticket management service, according to an example embodiment. The software module(s) that implements the method 200 is referred to as an "electronic ticket validator and manager." The electronic ticket validator and manager is implemented as executable instructions programmed and residing within memory and/or a non-transitory computer-readable (processor-readable) storage medium and executed by one or more processors of one or more devices. The processor(s) of the device that executes the electronic ticket validator and manager are specifically configured and programmed to process the electronic ticket validator and manager. The electronic ticket validator and manager may have access to one or more network connections during its processing. The network connections can be wired, wireless, or a combination of wired and wireless.

In an embodiment, the device that executes the electronic ticket validator and manager is cloud 110. Cloud 110 comprises a plurality of servers logically cooperating and accessible as a single server 110 (cloud 110).

In an embodiment, the device that executes the electronic ticket validator and manager is a server 110 that is separate from any given ticket issuer/redemption server 140.

In an embodiment, the electronic ticket validator and manager is all or some combination of 113 and 114.

At 210, the electronic ticket validator and manager generates a unique hash value from an electronic ticket without maintaining or storing a unique serial number or unique identifying string associated with the electronic ticket.

In an embodiment, at 211, the electronic ticket validator and manager receives the electronic ticket from a ticket issuer server 140 during a purchase of the electronic ticket at a vendor terminal 130.

In an embodiment, at 212, the electronic ticket validator and manager receives the electronic ticket from a vendor terminal 130 during a purchase of the electronic ticket.

In an embodiment, at 213, the electronic ticket validator and manager receives the electronic ticket from the device 120 after the electronic ticket is purchased and stored on the device 120.

In an embodiment, at 214, the electronic ticket validator and manager generates a code associated with the ticket details of the electronic ticket and instruct a vendor terminal 130 to display the code on a display of the vendor terminal 130 during a purchase of the electronic ticket.

In an embodiment, at 215, the electronic ticket validator and manager instructs a vendor terminal 130 to display a print preview image of the electronic ticket on a display of the vendor terminal 130 for capturing by the device 120 during a purchase of the electronic ticket.

At 220, the electronic ticket validator and manager links a device identifier associated with a device 120 that maintains the electronic ticket to the hash value.

At 230, the electronic ticket validator and manager maintains a record associated with the electronic ticket using the hash value and the device identifier for device 120.

In an embodiment, at 231, the electronic ticket validator and manager maintains a ticket issuer server identifier for a ticket issuer server 140 that issued the electronic ticket, a vendor terminal identifier for a vendor terminal 130 where the electronic ticket was purchased, a purchase date of the electronic ticket, and a purchase date time of day within the record.

At 240, the electronic ticket validator and manager provides an authentication message or a non-authentication message when a redemption request is made on the electronic ticket based on the record.

In an embodiment of 231 and 240, at 241, the electronic ticket validator and manager sets a flag on the record when the authentication message is provided.

In an embodiment of 241 and at 242, the electronic ticket validator and manager updates the record with a redemption terminal identifier for a redemption terminal 130 that is processing the redemption request, a redemption date of the electronic ticket, and redemption date time of day of the electronic ticket when the authentication message is provided.

In an embodiment of 242 and at 243, the electronic ticket validator and manager sends a redemption message to the device 120 when the authentication message is provided. The redemption message comprises a location or store identifier associated with the redemption terminal identifier, the redemption date, and the redemption date time of day.

In an embodiment of 240 and at 244, the electronic ticket validator and manager provides the non-authentication message when the redemption request is determined to not be associated with the device identifier for the device 120 or when the record indicates a previous redemption was processed for the electronic ticket.

In an embodiment, at 250, the electronic ticket validator and manager receives a transfer request for the electronic ticket from the device 120. The transfer request comprises a second and different device identifier for a second device 120 and ticket details of the electronic ticket. The electronic ticket validator and manager provides the ticket details to the second device 120 and removes the ticket details from memory. Finally, the electronic ticket validator and manager updates the record with the second device identifier linking the record now to the second device 120.

FIG. 3 is a diagram of another method 300 for operating a paperless ticket management service, according to an example embodiment. The software module(s) that implements the method 300 is referred to as a "ticket wallet app." The ticket wallet app is implemented as executable instructions programmed and residing within memory and/or a non-transitory computer-readable (processor-readable) storage medium and executed by one or more processors of a device. The processors that execute the ticket wallet app are specifically configured and programmed for processing the ticket wallet app. The ticket wallet app may have access to one or more network connections during its processing. The network connections can be wired, wireless, or a combination of wired and wireless.

In an embodiment, the device that executes the ticket wallet app is user device 120. In an embodiment, the device 120 is a phone, a tablet, a laptop, a desktop computer, or a wearable processing device.

In an embodiment, the ticket wallet app is all of or some combination of 123 and/or 124.

The ticket wallet app interacts with ticket service 113 and/or method 200.

At 310, the ticket wallet app obtains ticket details for a ticket.

In an embodiment, at 311, the ticket wallet app obtains from an integrated camera of device 120 a code or an image of the ticket displayed on a ticket vendor terminal 130 during a purchase of the ticket.

At 320, the ticket wallet app encrypts and stores the ticket details on the device, such that just and only the ticket wallet app can decrypt and access the ticket details.

At 330, the ticket wallet app interacts with a ticket service 113 to determine whether the ticket has already been redeemed.

At 340, the ticket wallet app provides a user interface to a user who is operating device 120 for accessing the ticket details, managing the ticket with other tickets of the user, and printing the ticket on demand.

In an embodiment, at 350, the ticket wallet app receives a print request through the interface and determines whether the print request is a first print request of the ticket received through the interface. The ticket wallet app also interacts with the ticket service 113 to determine whether the ticket has already been redeemed. Finally, the ticket wallet app provides a print image of the ticket details to a printer associated with the print request when the print request is the first print request and when interaction with the ticket service 113 indicates the ticket has not previously or has not already been redeemed.

In an embodiment of 350 and at 351, the ticket wallet app provides the print image to the printer when the print request is the first print request and when interaction with the ticket service 113 indicates that the ticket has not already been redeemed. The ticket wallet app also provides through the interface a caution notification to the user indicating that the user has previously printed the ticket.

In an embodiment of 350 and at 352, the ticket wallet app provides through the interface a message indicating that the ticket cannot be printed when interaction with the ticket service 113 indicates that the ticket has already been redeemed.

In an embodiment of 340 and at 360, the ticket wallet app provides through the interface device notification capabilities (functions) based on the ticket details and based on proactively and autonomously interacting with a ticket issuer server 140 that issued the ticket. Additionally, the ticket wallet app provides through the interface searching capabilities, filtering capabilities, reporting capabilities, and auditing capabilities based on the ticket details and based on other ticket details associated with other tickets of the user being managed by ticket wallet app on device 120.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining, by a device, ticket details for an electronic ticket from an image of the electronic ticket that is displayed on a display of a vendor terminal during a purchase of the electronic ticket;
    encrypting, by the device, the ticket details with a device key associated with the device and storing encrypted ticket details on the device, wherein the encrypted ticket details are not accessible outside the device;
    obtaining a ticket serial number and a security code from the ticket details, wherein the ticket serial number uniquely identified the electronic ticket;
    sending the ticket serial number and the security code to a ticket service;
    receiving, from the ticket service a hash value generated from a concatenation of the ticket serial number and the security code, wherein the ticket service does not maintain the ticket serial number or the security code after generating the hash value;
    searching records for a match of the hash value;
    upon determined that no match is found, creating a record associated with the electronic ticket, the record comprising the hash value and additional information associated with the device;
    linking a device identifier associated with the device that obtained the ticket details to the hash value by storing the device identifier in the record;
    maintaining the record associated with the electronic ticket based on the hash value and the device identifier; and
    determining, based on the record, whether to provide an authentication message or a non-authentication message when a redemption request is made for the electronic ticket.

2. The method of claim 1, wherein obtaining the ticket details comprises receiving the electronic ticket from a ticket issuer server during a purchase of the electronic ticket at a vendor terminal.

3. The method of claim 1, wherein obtaining the ticket details comprises receiving the electronic ticket from the vendor terminal during a purchase of the electronic ticket.

4. The method of claim 1, wherein obtaining the ticket details comprises receiving the electronic ticket from the device after the electronic ticket is purchased and stored on the device.

5. The method of claim 1, wherein obtaining the ticket details comprises generating the security code associated with the ticket details of the electronic ticket and instructing the vendor terminal to display the security code on the display of the vendor terminal for capturing by the device during the purchase of the electronic ticket.

6. The method of claim 1, wherein obtaining the ticket details comprises instructing the vendor terminal to display a print preview image of the electronic ticket on the display of the vendor terminal for capturing by the device during a purchase of the electronic ticket.

7. The method of claim 1, wherein maintaining comprises a ticket issuer server identifier for a ticket issuer server that issued the electronic ticket, a vendor terminal identifier for the vendor terminal where the electronic ticket was purchased, a purchase date of the electronic ticket, and a purchase time of day within the record.

8. The method of claim 7, wherein determining comprises setting a flag on the record when the authentication message is provided.

9. The method of claim 8, wherein determining further comprises updating the record with a redemption terminal identifier for a redemption terminal that is processing the redemption request, a redemption date of the electronic ticket, and a redemption time of day for the electronic ticket when the authentication message is provided.

10. The method of claim 9, wherein updating further comprises sending a redemption message to the device when the authentication message is provided, wherein the redemption message comprises a location or a store identifier associated with the redemption terminal identifier, the redemption date, and the redemption time of day.

11. The method of claim 1, wherein providing further comprises providing the non-authentication message when the redemption request is determined to not be associated with the device identifier.

12. The method of claim 1 further comprising:
receiving a transfer request for the electronic ticket from the device, wherein the transfer request comprises a second device identifier for a second device and the ticket details of the electronic ticket;
providing the ticket details to the second device;
removing the ticket details from memory; and
updating the record with the second device identifier.

* * * * *